United States Patent Office 3,730,685
Patented May 1, 1973

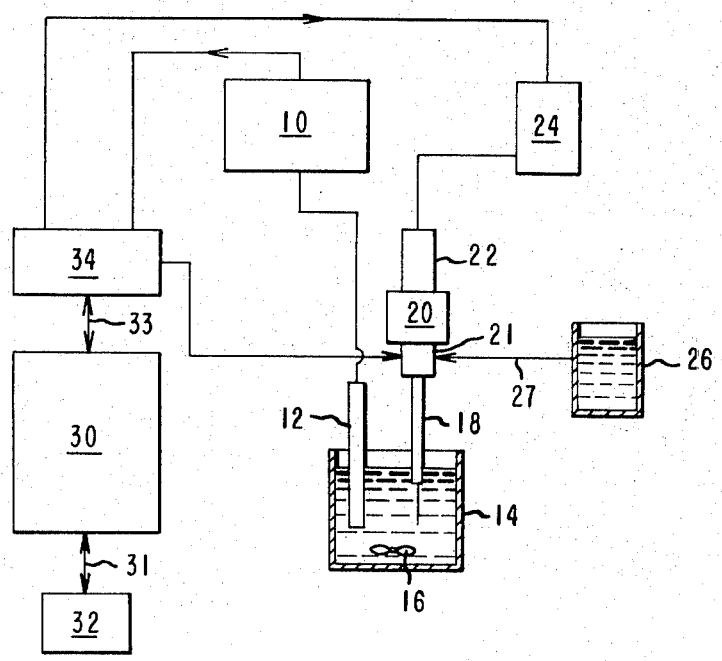

3,730,685
COMPUTER CONTROLLED METHOD OF TITRATION
Charles Anton Prohaska, Seaford, Del., assignor to E. I. du Pont de Nemours and Company, Wilmington, Del.
Filed Feb. 24, 1971, Ser. No. 118,342
Int. Cl. B01k 3/00; G01n 27/10, 27/56
U.S. Cl. 23—230 R                                    5 Claims

ABSTRACT OF THE DISCLOSURE

A computer-controlled process of titration, wherein the computer adds titrant to a solution in amounts which decrease as the end point is approached. The solution is allowed to reach equilibrium between each stepwise addition of titrant. The computer calculates the titration end point by use of a curve fitting algorithm to fit data stored from a final preselected number of titration points to find the optimum constants for an appropriate mathematical equation, e.g., a cubic equation, relating solution pH as a function of titrant added and then computing the maximum slope of the equation.

BACKGROUND OF THE INVENTION

This invention concerns a process of automatically performing titrations of solutions. Although the invention is of more general scope, it has been found specifically applicable to titrations of nylon polymer solutions in order to determine the concentration of certain functional chemical groups such as amine end groups.

It is known in the art to perform titrations automatically through the use of electronic computers, however known systems have failed to provide desired precision in determining the end point and, therefore, frequently result in end point overshoot. In addition, gradual increase in electrode sluggishness resulting from aging or other physical changes in the electrodes of the pH meter employed in determining end points have not been detectable by prior automated systems. Finally, the precision of the numerical concentration determination has in the past been lower than required by some end uses. The present invention substantially eliminates the problem of end point overshoot, announces the occurrence of unsatisfactory electrode performance and at the same time provides high precision functional group concentration analyses.

SUMMARY OF THE INVENTION

The process of this invention is carried out by means of a titration system comprising a digtal computer with interface connecting it to both a digital output pH meter and a stepping motor driving a positive displacement, micrometer screw type microburette. A conventional printer keyboard is connected to the computer; a titrant supply is connected to the microburette for automatic refill; and conventional solution preparation and presentation to the pH meter electrodes is provided. The process comprises the steps of electronic computer programmed and adjusted incremental additions of titrant acid to the specimen being analyzed and employing in this step computer determination of stable pH meter reading between additions and computer determination of end point proximity. Thus, the titration process is brought up to equilibrium between each stepwise addition of titrant acid and the magnitude of the increment of titrant addition is adjusted by computer program to be inversely related to the proximity of the end point of the analysis. The time for the pH meter reading to become stable as monitored by the computer can be compared to a preset value in the computer and the analysis can be aborted if this time exceeds a predetermined value. The computer is programmed to analyze the progress of the titration curve by determining the slope of the curve after each incremental addition of titrant. When the slope reaches certain predetermined levels, the size of the incremental addition is reduced by a predetermined amount. When the slope reaches a preselected high level, the increment is reduced to a final low value and the titration continued through the end point under a special section of the computer control program. In this part of the titration, the computer counts the number of seconds after the addition of a given titrant increment until the pH meter millivolt reading is stable. The computer then waits for an equal length of time before again reading the millivolt meter and then adding another incremental titrant quantity. When the value of the change in millivolt reading for one of these final size incremental additions starts to decrease, the end point is considered passed and the computer programs a predetermined number of additional additions of this increment before proceeding to the further steps. The computer then directs a refilling of the burette and proceeds to the calculation of the end point. The computer does this by using a curve fitting algorithm to fit the data stored from a final preselected number of titration points to find the optimum constants for an appropriate mathematical equation, e.g., a cubic equation, relating the pH meter millivolt reading as a function of titrant addition volume. The exact end point is then computed as the point of maximum slope of this equation. Next, the functional group concentration is computed from the end point value of titrant, the weight and moisture content of the specimen and the concentration of the titrant stored in the computer. The value of the pH meter reading at the end point is then calculated from the end point titrant volume level. Finally, the computed value of the functional group concentration and the end point millivolt magnitude are printed out by the printer-keyboard apparatus.

BRIEF DESCRIPTION OF THE DRAWING

The drawing is a block diagram and schematic representation of the apparatus components making up a preferred embodiment of the system in which this invention is applicable.

DESCRIPTION OF THE PREFERRED EMBODIMENT

In order to understand the details of this invention, a brief description of a typical apparatus system follows by reference to the drawing. A digital pH meter 10 is electrically connected in conventional fashion to pH electrode 12 which is immersed in the solution to be analyzed, contained in sample container 14. A magnetic stirrer 16 is provided in the solution and operated by a drive arrangement not shown. A microburette 18 is positioned so that its output contacts the sample under analysis. In association with burette 18 there is a three way solenoid valve 21, burette reservoir 20 and a stepping motor 22 electrically connected to a stepping motor controller 24. A titrant supply container 26 is connected over conduit 27 to three way valve 21. A conventional digital computer 30 connected to printer-keyboard 32 over cable 31 is also connected over cable 33 to interface 34. Interface 34 receives digital signals from pH meter 10 and sends out signals received from the computer to the stepping motor 24 and to the solenoid valve 21.

In the preferred embodiment, the amine end ($NH_2$) analysis for nylon polymer dissolved in methanol-phenol and titrated with perchloric acid is used to illustrate the novel process or method of this invention. The method applies when a specimen of polymer has been dissolved and the solution brought up to the electrode and burette 12, 18, respectively, either by an operator or by means of an automatic turntable. Necessary computer program and interface apparatus are provided to carry out the following method steps and groups of steps in order to perform a titration, compute a chemical concentration level quantity as a result of the titration and print out the results. Prior to the titration, sample weight and moisture content must be entered into the computer. During the various stages of the titration process the computer is programmed to perform as follows:

At the beginning of titration, the computer delays action until the millivolt meter (pH meter) reading is stable, that is, constant to plus or minus 0.3 mv. for 2 seconds. As soon as this occurs, the first increment (250 µl.) of titrant addition is ordered by the computer through the interface to the stepping motor controller. After waiting 10 seconds, the millivolt meter is read by computer and the initial slope of the titration curve $S_i$ (equal to $\Delta mv./250$) is calculated. Next, the computer orders a second addition or 250 microliters and after a 10 seconds delay, the millivoltmeter is again read and the present slope $S_p$ (equal to $\Delta mv./\Delta \mu l.$) is calculated for the present increment of titrant addition. Then, 250 microliter increments are added until the slope reaches a value of 0.06. The size of the incremental addition is then reduced to 80 microliters and the titration, monitored as above by the computer, is continued until the slope reaches 0.12. Now the computer reduces the magnitude of the incremental addition to 27.3 microliters.

In these latter stages of the titration, the computer is programmed to count the number of seconds required until the millivolt reading is stable after the addition of each increment. The computer then waits for an equal length of time before reading the millivolt meter. When the slope reaches 0.35, the magnitude of the incremental addition titrant is reduced to 9.74 microliters and the titration continued on through the end point. The end point is then considered passed if the change in millivolt reading per 9.74 microliter increment is found to decrease. The computer then programs five more incremental additions after the passage of the end point is so detected. The computer then signals the refilling of the burette.

The last thirteen values of millivolts and the corresponding values of titrant volume that have been added are stored by the computer. When the titration has been concluded, the computer makes a least squares analysis to fit the data corresponding to the 9.74 microliter increments to the best equation of the form:

$$Y = A + BX + CX^2 + DX^3$$

In this equation Y represents the millivolts and X the volume of titrant. Next, the computer determines the exact end point, defined as the point of maximum slope (for the best equation determined in the previous step) in accordance with the equation:

$$X_{end} = \frac{-C}{3D}$$

The computer is then programmed to calculate the concentration of amine ends based on the predetermined values of specimen weight, moisture content and acid titrant concentration. Finally, the computer prints out the value determined for the amine end level and the value of the pH meter millivolts at the end point.

The various values (e.g., 250, 80, 27.3 and 9.74 microliters) have been selected arbitrarily for the illustrated amine end determination for nylon polymer. Obviously, the values of these increments would be modified for other types of titrations on different materials or for different functional groups to be determined.

Thus, a novel method of carrying out a titration in a chemical analysis has been provided in which the titration is programmed to be carried out at equilibrium at each step under closed loop control of a computer with improved efficiency through ongoing modifications of the rate of titrant addition and improved computation of the titration curve and the end point determination.

Numerous variations are possible within the scope of this invention. For example, the determination of end point from the titration data stored in the computer may be carried out by finding optimum constants for appropriate mathematical expressions other than the illustrated cubic equation. Specification, an equation of the general form $$Y = c \cot^{-1}\left(\frac{X-a}{b}\right)$$

provides a curve of the proper shape over a wider range of data than the above-noted cubic curve. In this equation, as with the previous one, Y represents millivolts and X the volume of titrant. A curve fitting algorithm using the method of successive approximations rather than least squares analysis could be used to fit this equation with a larger number of data points.

I claim:

1. In a process for determining the end point of a potentiometric titration of a solution that includes the steps of: adding incremental amounts of titrant at preselected points in the process, generating signals proportional to the pH of the solution and detecting the end point of the titration from the value of the signals and the amount of titrant added, the improvement comprising: allowing said signals to stabilize within a predetermined period of time after each addition of titrant; automatically determining the proximity of said end point; adjusting the amount of titrant added at said points in an inverse relationship to the proximity of said end point, said amount being adjusted downwardly to a final low value; adding final low value amounts of titrant at a plurality of points beyond said end point; and generating by means of a computer a representation of said end point as the maximum slope of an appropriate mathematical equation determined by means of a curve fitting algorithm using said signals and the amount of titrant added at a final preselected number of titration points as inputs to the computer.

2. The process as defined in claim 1, said mathematical equation being a cubic equation and said curve fitting algorithm being a least squares analysis.

3. The process as defined in claim 2, said solution comprising nylon polymer and methanol-phenol.

4. The process as defined in claim 3, said titrant being perchloric acid.

5. The process as defined in claim 4, final low value amounts of titrant being added at five points beyond said end point.

References Cited

UNITED STATES PATENTS

| | | | |
|---|---|---|---|
| 2,770,531 | 11/1956 | Hawes et al. | 23—253 X |
| 2,898,200 | 8/1959 | Karr | 23—253 |
| 2,950,178 | 8/1960 | Halfter | 23—253 |
| 3,026,182 | 3/1962 | Jankowski | 23—230 A |
| 3,073,682 | 1/1963 | Lindsley | 23—253 X |
| 3,157,471 | 11/1964 | Harrison | 23—253 |
| 3,186,800 | 6/1965 | Strickler | 23—253 |
| 3,625,655 | 12/1971 | Culp et al. | 23—253 R |

MORRIS O. WOLK, Primary Examiner

R. E. SERWIN, Assistant Examiner

U.S. Cl. X.R.

23—230 A, 253 R, A; 204—195 T; 235—151.12, 151.13; 324—30 R